(12) United States Patent  
Lemberger et al.

(10) Patent No.: US 6,374,666 B1  
(45) Date of Patent: Apr. 23, 2002

(54) PRESSURE GAUGE FOR VEHICLE TIRES

(76) Inventors: Gary Lemberger, 100 NW. 82nd Ave., Suite 402, Plantation, FL (US) 33324; Michael M. Anthony, 10189 W. Sample Rd., Coral Springs, FL (US) 33065

( * ) Notice: Subject to any disclaimer, the term of this patent is extended or adjusted under 35 U.S.C. 154(b) by 0 days.

(21) Appl. No.: 09/523,470

(22) Filed: Mar. 10, 2000

(51) Int. Cl.$^7$ .............................................. B60C 23/02
(52) U.S. Cl. ...................................................... 73/146.8
(58) Field of Search ............................ 73/146.8, 146.2, 73/146.5, 715; 116/30 R; 137/224, 225

(56) References Cited

U.S. PATENT DOCUMENTS

| | | | |
|---|---|---|---|
| 4,310,014 A | 1/1982 | Parker | 137/227 |
| 4,384,543 A | 5/1983 | Wong | 116/34 R |
| 4,901,747 A | 2/1990 | Yabor | 137/227 |
| 4,924,697 A | 5/1990 | Hunt et al. | 73/146.8 |
| 5,014,643 A | 5/1991 | Huang | 116/34 R |
| 5,503,012 A | 4/1996 | Rabizadeh | 73/146.8 |
| 5,569,849 A | 10/1996 | Cummings | 73/146.8 |
| 5,856,919 A | 1/1999 | Wang | 73/146.5 |
| 5,886,254 A | 3/1999 | Chi | 73/146.8 |
| 5,929,330 A * | 7/1999 | Ford | 73/146.8 |
| 5,957,151 A * | 9/1999 | Dalcourt et al. | 137/225 |
| 5,979,232 A | 11/1999 | Halcomb | 73/146.8 |

* cited by examiner

Primary Examiner—William Oen  
Assistant Examiner—Abdullahi Aw-Musse  
(74) Attorney, Agent, or Firm—Oltman, Flynn & Kubler

(57) ABSTRACT

A tire pressure gauge apparatus for securing to a vehicle tire valve stem mounted to a tire valve stem port in a vehicle tire, the valve stem including a tubular stem body containing a valve assembly having a valve opening mechanism, the stem body having a stem connection end fitting sealingly to the tire valve stem port, and having a stem air receiving end, the apparatus including a housing for placement in fluid communication with received air from within the tire contained within the tire valve stem; a structure for opening the valve opening mechanism; and a pressure equilibration structure dividing the housing into a received air chamber and a biasing air chamber and including a pressure indicator element, the pressure equilibration structure and the pressure indicator element being movable relative to the housing, and the pressure indicator element displaying a pressure reading of received air from within the tire which varies with the position of the pressure equilibration structure relative to the housing; so that alteration of the pressure of received air within the received air chamber from the valve stem causes movement of the equilibration structure within the housing to re-establish pressure equilibrium between biasing air sealed within the biasing air chamber and received air within the received air chamber, and movement of the equilibration structure causes the indicator element to move relative to the housing to provide a received air pressure reading.

20 Claims, 13 Drawing Sheets

PRESSURE GAUGE FOR VEHICLE TIRES

BACKGROUND OF THE INVENTION

1. Field of the Invention

The present invention relates generally to the fields of tires and tire pressure gauges. More specifically the present invention relates to an air pressure gauge apparatus which is combined with a tire valve stem to remain on the stem and continuously display the tire pressure, so that at any moment the user can see at a glance whether the tire is properly inflated, and thus know at a glance whether the tire is safe and providing optimum tire wear and fuel efficiency. The gauge apparatus preferably is combined with the valve stem either by screwing it onto existing external cap threads of the valve stem and letting it remain attached until momentary removal during tire inflation, or by integrating it permanently into the structure of the valve stem during stem manufacture.

The essential elements of the apparatus include an apparatus housing, containing a received air chamber for placement in fluid communication with received air from within a vehicle tire and containing a biasing air chamber containing a fixed quantity of biasing air, the chambers being sealingly separated from each other by a pressure equilibration structure which includes a pressure indicator element. The pressure equilibration structure moves within the housing to alter the relative volumes of the two chambers and thus to equalize the pressures of the two chambers. The pressure indicator element moves relative to the apparatus housing as the equilibration structure moves to equalize chamber pressures to display a tire pressure reading. The gauge apparatus operates on the principle of continuous re-establishment of pressure equilibrium, where alteration of received air pressure from outside the apparatus, that is, from within the tire, causes movement of the pressure equilibration structure within the housing against the trapped, fixed quantity of biasing air sealed within the biasing air chamber, thereby moving the indicator structure to reveal the pressure reading. The biasing air functions as a fixed standard against which varying tire pressure is measured.

2. Description of the Prior Art

There have long been gauges for measuring the pressure of air contained within vehicle tires. All of these prior gauges have relied on springs to provide biasing against which a pressure reading is taken. A problem with such prior gauges is that springs can lose resiliency, can corrode, and can add cost and complexity to the gauges.

These prior, spring biased -gauges include Parker, U.S. Pat. No. 4,310,014, issued on Jan. 12, 1982 for a tire pressure indicator integral with a tire stem; Yabor, U.S. Pat. No. 4,901,747, issued on Feb. 20, 1990 for a tire inflation valve with a pressure indicator; Hunt, et al., U.S. Pat. No. 4,924,697, issued on May 15, 1990 for a tire-mounted air pressure gauge assembly; Huang, U.S. Pat. No. 5,014,643, issued on May 14, 1991 for a tire pressure indicator; Rabizadeh, U.S. Pat. No. 5,503,012, issued on Apr. 12, 1996 for a tire pressure monitoring device; Cummings, U.S. Pat. No. 5,569,849, issued on Oct. 29, 1996 for a visual tire cap pressure gauge; Wang, U.S. Pat. Np. 5,856,619, issued on Jan. 5, 1999 for a tire pressure indicator; Halcomb, U.S. Pat. No. 5,979,232, issued on Nov. 9, 1999 for a tire pressure indicator carried aboard a wheel; Chi, U.S. Pat. No. 5,886,254, issued on Mar. 23, 1999 for a tire valve pressure-indicating cover utilizing colors to indicate tire pressure.

On the other hand, Wong, U.S. Pat. No. 4,384,543, issued on May 24, 1983, discloses a air release check valve and indicator device which automatically releases air from an over-inflated tire. A critical problem with Wong is that the device is inoperative, for multiple reasons. First, air from within a tire stem bearing against the piston 19 cannot move piston 19 because its pressure is opposed by equivalent air pressure entering the piston cylinder 16 through port 34. Thus the piston will not move no matter what tire air pressure is introduced into the device housing, and the device cannot function either as a pressure relief valve or as a pressure indicator. Nor can Wong receive air from an air line to fill the tire. Air entering Wong would have no way of moving the piston shaft to place its narrower segment within the partition aperture.

None of the displaceable, pressure measuring structures within the known prior art gauges are at equilibrium and at rest prior to installation on a tire. All have set points above atmospheric, unlike the gauge embodiments of the present application:

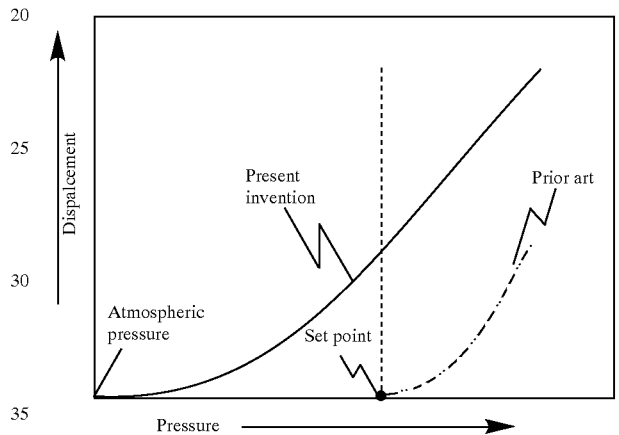

It is thus an object of the present invention to provide a tire gauge apparatus which relies on pressure equilibration rather than on a mechanical spring to produce a tire pressure reading.

It is another object of the present invention to provide such a gauge apparatus which remains on the tire and produces an accurate and easily visible tire pressure reading.

It is still another object of the present invention to provide such a gauge apparatus which can be integrated into a valve step during manufacture.

It is yet another object of the present invention to provide such a gauge apparatus which is initially at equilibrium with the atmosphere, is always active, which measures both under- and over-inflation, which can be constructed with a thin pressure responsive membrane with no elastic force constant, and does not rely on pre-set valves.

It is finally an object of the present invention to provide such a valve stem which is highly economical to manufacture, simple in design, light weight, compact and highly durable.

SUMMARY OF THE INVENTION

The present invention accomplishes the above-stated objectives, as well as others, as may be determined by a fair reading and interpretation of the entire specification.

A tire pressure gauge apparatus is provided for securing to a vehicle tire valve stem mounted to a tire valve stem port in a vehicle tire, the valve stem including a tubular stem body containing a valve assembly having a valve opening mechanism, the stem body having a stem connection end fitting sealingly to the tire valve stem port, and having a stem air receiving end, the apparatus including a housing for placement in fluid communication with received air from within the tire contained within the tire valve stem; a structure for opening the valve opening mechanism;

and a pressure equilibration structure dividing the housing into a received air chamber and a biasing air chamber and including a pressure indicator element, the pressure equilibration structure and the pressure indicator element being movable relative to the housing, and the pressure indicator element displaying a pressure reading of received air from within the tire which varies with the position of the pressure equilibration structure relative to the housing; so that alteration of the pressure of received air within the received air chamber from the valve stem causes movement of the equilibration structure within the housing to re-establish pressure equilibrium between biasing air sealed within the biasing air chamber and received air within the received air chamber, and movement of the equilibration structure causes the indicator element to move relative to the housing to provide a received air pressure reading.

A tire pressure gauge apparatus is further provided for securing to a vehicle tire valve stem mounted to a valve stem port in a vehicle tire, the valve stem including a tubular stem body containing a valve assembly having an outwardly biased valve opening shaft, the stem body having a stem connection end with a circumferential groove for fitting sealingly into an edge of the tire valve stem port, and having a stem air receiving end having external threads for affixation of a valve stem cap and having internal threads into which the valve assembly is screwed, the apparatus including a housing for placement in fluid communication with received air from within the tire contained within the tire valve stem; a structure for depressing the valve opening shaft and thereby opening the valve assembly, the structure for depressing being connected to the housing; and a pressure equilibration structure dividing the housing into a received air chamber and a biasing air chamber and including a pressure indicator element, the pressure equilibration structure and the pressure indicator element being movable relative to the housing, and the pressure indicator element displaying a pressure reading of received air from within the tire which varies with the position of the pressure equilibration structure relative to the housing; so that alteration of the pressure of received air within the received air chamber from the valve stem causes movement of the equilibration structure within the housing to re-establish pressure equilibrium between biasing air sealed within the biasing air chamber and received air within the received air chamber, and movement of the equilibration structure causes the indicator element to move relative to the housing to provide a received air pressure reading. The housing preferably is a tubular housing having an open connection end and a closed indicator display end, the biasing air chamber including an indicator display window and terminating in an integral housing end wall; and the pressure equilibration structure preferably includes a diaphragm disk and the indicator element includes an indicator cylinder marked with calibrations and secured to the diaphragm disk and extending into the biasing air chamber and passing adjacent to the indicator display window, the diaphragm disk being sized in diameter to fit within the housing and being sealingly and circumferentially joined to the inner surface of the housing; structure for sealingly securing the diaphragm disk to the step; a valve opening shaft depression structure for depressing the valve opening shaft to release air from within the tire into the received air chamber; structure for securing the valve stem body to and in fluid communication with the received air chamber; so that the apparatus is screwed onto the stem air receiving end to create a seal between the received air chamber and the valve stem body, and so that the valve opening shaft depression structure depresses the valve opening shaft to an extent which opens the valve assembly to pass air from within the tire into the received air chamber and against the diaphragm disk; and so that pressure of received air from within the tire deflects the diaphragm disk toward the biasing air chamber, thereby compressing the biasing air until the pressure of the biasing air rises to equal the pressure of the received air within the received air chamber, whereupon the attached indicator cylinder comes to rest to indicate the pressure of air contained within the received air chamber and within the tire. The calibrations preferably are either circumferential color bands or are lines labeled with pressure reading figures.

The housing once again is preferably a tubular housing having an open connection end and a closed indicator display end, the biasing air chamber including an indicator display window and an integral housing end wall; and the indicator element preferably includes an indicator cylinder dividing the biasing air chamber from the received air chamber and being slidably mounted within the housing to slide into and out of the biasing air chamber, the indicator cylinder being marked with calibrations and passing adjacent to the indicator display window; a valve opening shaft depression structure for depressing the valve opening shaft to release air from within the tire into the received air chamber; structure for securing the valve stem body to and in fluid communication with the received air chamber; so that the apparatus is screwed onto the stem air receiving end to create a seal between the received air chamber and the valve stem body, and so that the valve opening shaft depression structure depresses the valve opening shaft to an extent which opens the valve assembly to pass air from within the tire into the received air chamber and against the indicator cylinder; and so that pressure of received air from within the tire slides the indicator cylinder into the biasing air chamber, thereby compressing the biasing air until the pressure of the biasing air within the biasing air chamber rises to equal the pressure of the received air within the received air chamber, whereupon the indicator cylinder comes to rest to indicate the pressure of air contained within the received air chamber and within the tire.

The housing once again is preferably a tubular housing having an open connection end and a closed indicator display end, the biasing air chamber including an indicator display window and terminating in an integral housing end wall; and the pressure equilibration structure preferably includes a partition wall having a partition wall air passing port and an indicator bellows secured to the partition wall over the partition wall air passing port and extending into the biasing air chamber, the indicator bellows being axially expandable into the biasing air chamber, the indicator bellows being marked with calibrations and passing adjacent to the indicator display window; a valve opening shaft depression structure for depressing the valve opening shaft to release air from within the tire into the received air chamber and into the indicator bellows; structure for securing the valve stem body to and in fluid communication with the received air chamber; so that the apparatus is screwed onto the stem air receiving end to create a seal between the received air chamber and the valve stem body, and such that the valve opening shaft depression structure depresses the valve opening shaft to an extent which opens the valve assembly to pass air from within the tire into the received air chamber and into the indicator bellows; and so that pressure of received air from within the tire expands the indicator bellows into the biasing air chamber, thereby compressing the biasing air until the pressure of the biasing air within the biasing air chamber rises to equal the pressure of the received air within the received air chamber, whereupon the attached indicator bellows ceases to expand, and indicates the pressure of air contained within the received air chamber and tire.

A tire pressure gauge and valve stem apparatus is provided for securing into a valve stem port in a vehicle tire, including a vehicle tire valve stem having a tubular stem body containing a valve assembly, the stem body having a stem connection end with a structure for fitting sealingly into a tire valve stem port, and having a stem air receiving end; a gauge housing secured to the valve stem body in fluid communication with received air contained within the valve stem body through a valve stem body lateral opening; and a pressure equilibration structure dividing the housing into a received air chamber and a biasing air chamber and including a pressure indicator element, the pressure equilibration structure and pressure indicator element being movable relative to the housing and displaying a pressure reading of received air from within the tire which varies with the position of the pressure equilibration structure relative to the housing; so that alteration of the pressure of received air within the received air chamber causes movement of the pressure equilibration structure within the housing to re-establish pressure equilibrium between biasing air sealed within the biasing air chamber and received air within the received air chamber, and movement of the equilibration structure causes the indicator element to move relative to the housing to provide a received air pressure reading. The housing is preferably a tubular housing having a connection end secured to a side of the valve stem body and a closed indicator display end, the biasing air chamber including an indicator display window and terminating in an integral housing end wall; and the pressure equilibration structure preferably includes a diaphragm disk and the indicator element preferably includes an indicator cylinder marked with calibrations and secured to the diaphragm disk and extending into the biasing air chamber and passing adjacent to the indicator display window, the diaphragm disk being sized in diameter to fit within the housing and being sealingly and circumferentially joined to the inner surface of the housing; and structure for sealingly securing the diaphragm disk to the step; so that pressure of received air from within the tire deflects the diaphragm disk toward the biasing air chamber, thereby compressing the biasing air until the pressure of the biasing air within the biasing air chamber rises to equal the pressure of the received air within the received air chamber, whereupon the attached indicator cylinder comes to rest to indicate the pressure of air contained within the received air chamber and within the tire. The calibrations once again preferably are either circumferential color bands or are lines labeled with pressure reading figures.

The housing once again is preferably a tubular housing having a connection end secured to a side of the valve stem body and a closed indicator display end, the biasing air chamber including an indicator display window and terminating in an integral housing end wall; and the indicator element preferably includes an indicator cylinder dividing the biasing air chamber from the received air chamber and being slidably mounted within the housing to slide into and out of the biasing air chamber, the indicator cylinder being marked with calibrations and passing adjacent to the indicator display window; so that pressure of received air from within the tire slides the indicator cylinder into the biasing air chamber, thereby compressing the biasing air until the pressure of the biasing air within the biasing air chamber rises to equal the pressure of the received air within the received air chamber, whereupon the indicator cylinder comes to rest to indicate the pressure of air contained within the received air chamber and within the tire. Once again, the calibrations preferably are either circumferential color bands or are lines labeled with pressure reading figures.

The housing once again is preferably a tubular housing having a connection end and a closed indicator display end, the biasing air chamber including an indicator display window and terminating in an integral housing end wall; and the pressure equilibration structure preferably includes a partition wall having a partition wall air passing port and an indicator bellows secured to the partition wall over the partition wall air passing port and extending into the biasing air chamber, the indicator bellows being axially expandable into the biasing air chamber, the indicator bellows being marked with calibrations and passing adjacent to the indicator display window; so that pressure of received air from within the tire expands the indicator bellows into the biasing air chamber, thereby compressing the biasing air until the pressure of the biasing air within the biasing air chamber rises to equal the pressure of the received air within the received air chamber, whereupon the attached indicator bellows ceases to expand and achieves a substantially fixed position relative to the housing to indicate the pressure of air contained within the received air chamber and within the tire. The tubular housing optionally includes an abrupt reduction in diameter between the connection end and the indicator display end defining a housing step forming a housing shoulder, so that the housing connection end is a wider housing tube segment defining the received air chamber and the housing indicator display end is a narrower housing tube segment defining the biasing air chamber; and the diaphragm disk is secured sealingly against the housing shoulder.

A tire pressure gauge and valve stem apparatus is further provided for securing into a valve stem port in a vehicle tire, including a vehicle tire valve stem having a tubular stem body containing a valve assembly, the stem body having an outer surface and having a stem connection end with structure for fitting sealingly into a tire valve stem port, and having a stem air receiving end; a gauge housing including a housing circumferential wall formed of a translucent material and bowed outwardly from the circumferential wall along the longitudinal axis of the housing circumferential wall and wrapped sealingly and circumferentially around the valve stem body; and the equilibration structure preferably is an elastic bladder contained within the housing circumferential wall and wrapped circumferentially around and sealingly secured to the outer surface of the tubular stem body; a stem branch passageway extending laterally from the interior of the stem body and opening within the bladder; and a substantially opaque liquid contained within an annular space defined between the bladder and the housing circumferential wall together with a certain quantity of biasing air; the quantity and pressure of the biasing air and as the elastic resistance of the bladder in relation to the minimum adequate tire air pressure being so that a tire air pressure of at least a certain magnitude which is deemed adequate causes the bladder to expand radially, to compress the biasing air and to displace the substantially opaque liquid and bear against the inner surface of the housing circumferential wall, making a portion of the bladder visible through the housing circumferential wall, and so that a tire air pressure of less than the certain magnitude deemed adequate permits the elasticity of the bladder and the pressure of the biasing air to retract the bladder from contact with the housing circumferential wall and the substantially opaque liquid to flow between the bladder and the circumferential wall to obscure the bladder from view. The bladder preferably is brightly pigmented and the opaque liquid is darkly pigmented for increased visual contrast between the bladder and the opaque liquid for greater bladder visibility when the bladder bears against the housing circumferential wall. dr

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

Figure 1:
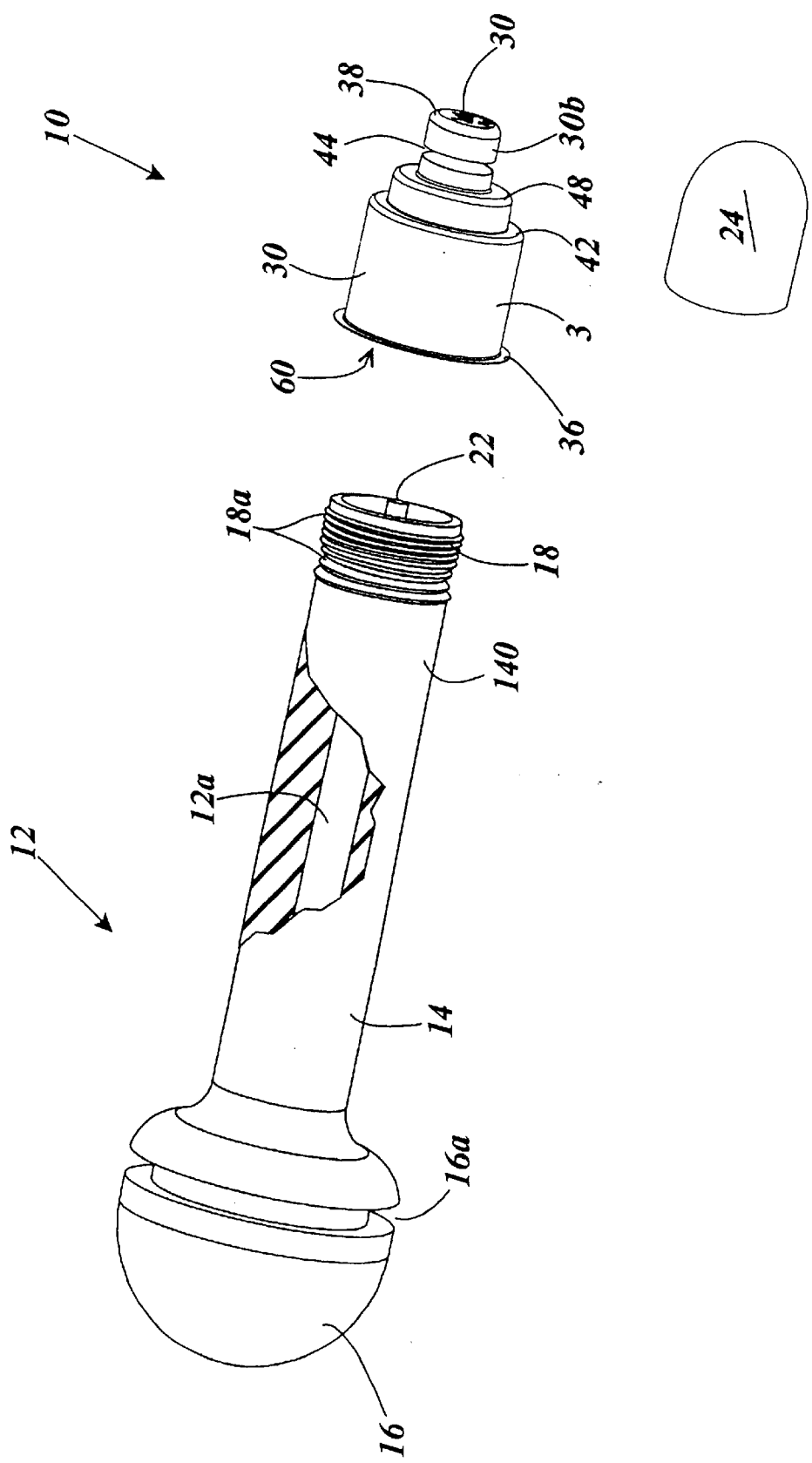
FIG. 1 is a perspective view of the first embodiment of the gauge apparatus adjacent to the threaded end of a standard valve stem shown in partial cross-section, also showing the valve stem cap.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

The Invention Generally

Figure 2:
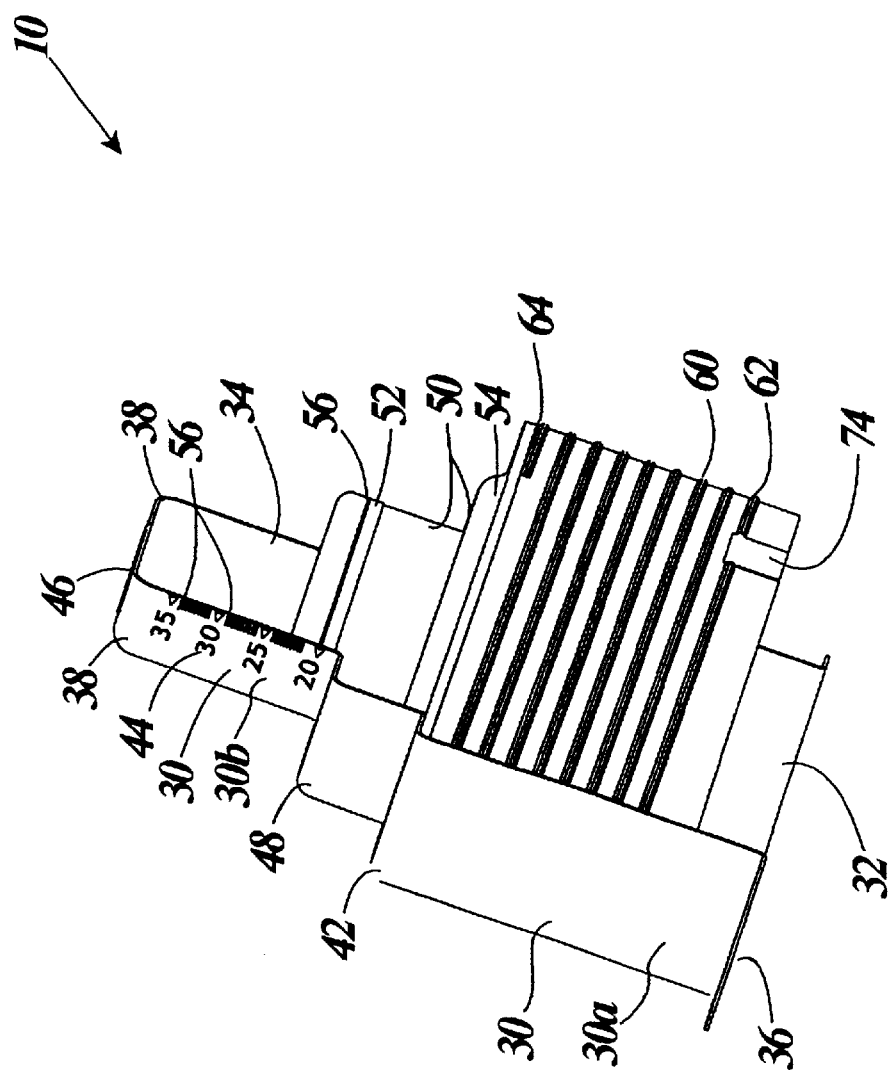
FIG. 2 is a cut-away perspective view of the first embodiment of the gauge apparatus showing the fitting structure, diaphragm disk, indicator element and calibrated display window.
Figure 3:
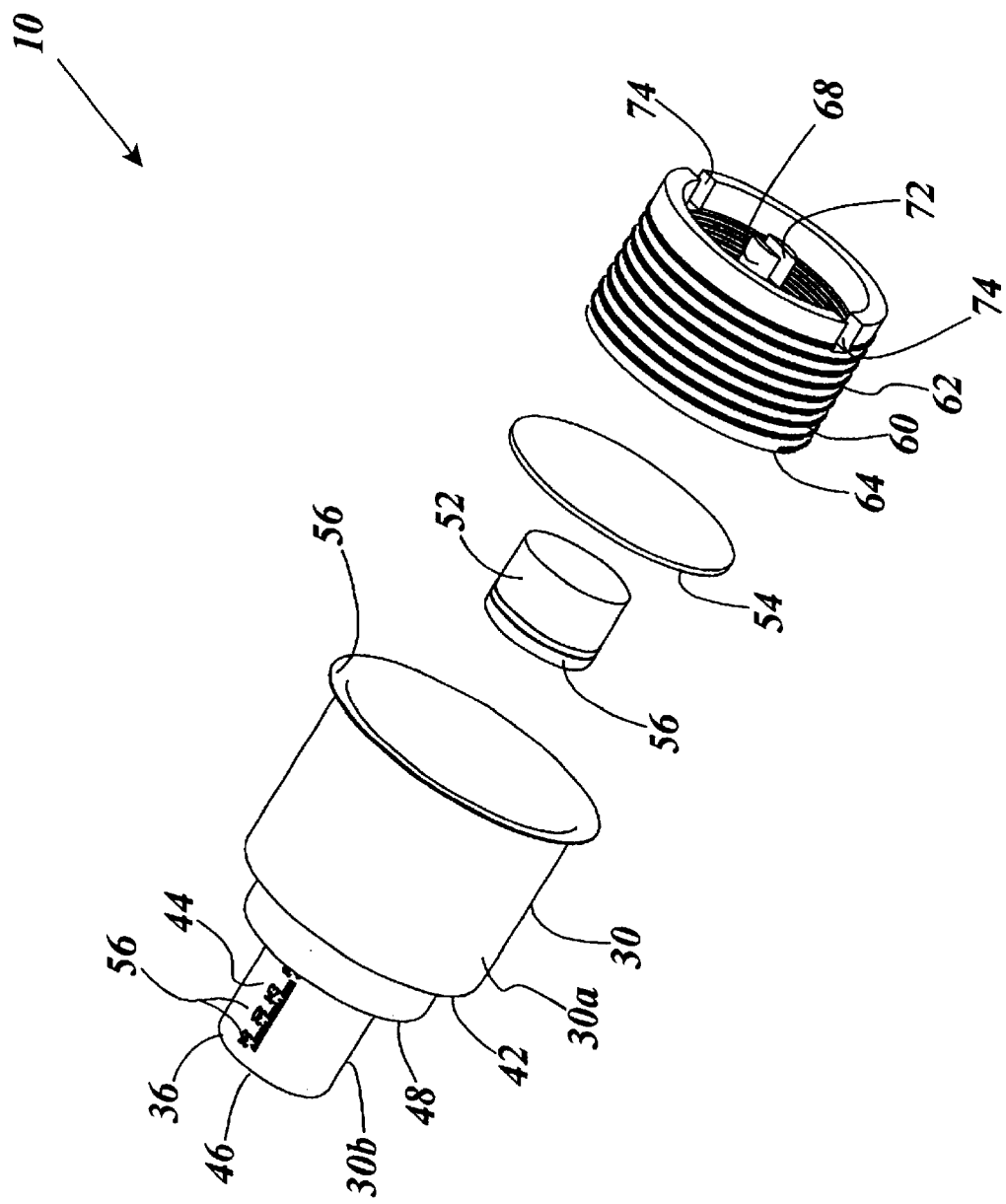
FIG. 3 is an exploded view of the elements of the first embodiment, revealing the valve opening shaft depression projection structure.
Figure 4:
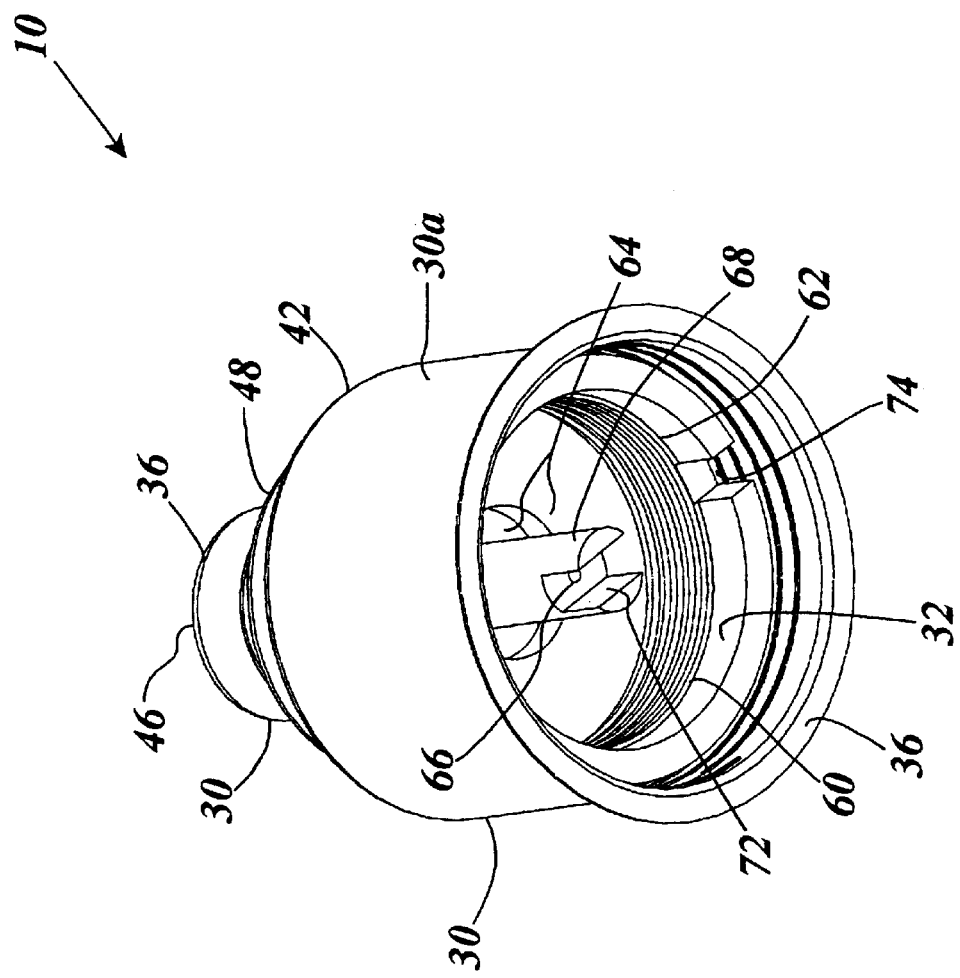
FIG. 4 is a perspective bottom view of the apparatus of the first embodiment.
Figure 5:
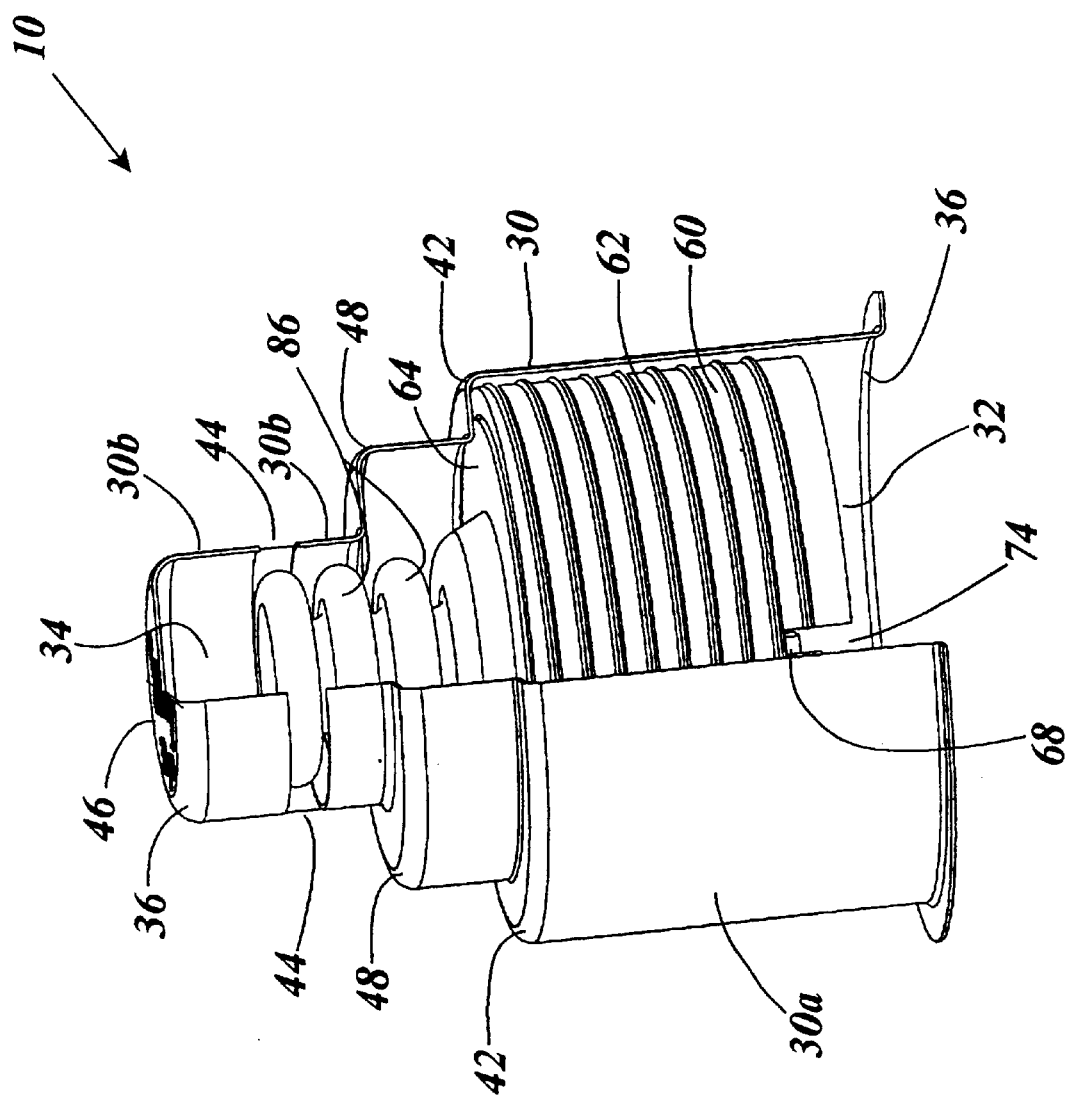
FIG. 5 is a cut-away perspective view as in FIG. 2 of the second embodiment of the gauge apparatus having the expandable bellows indicator element.
Figure 6:
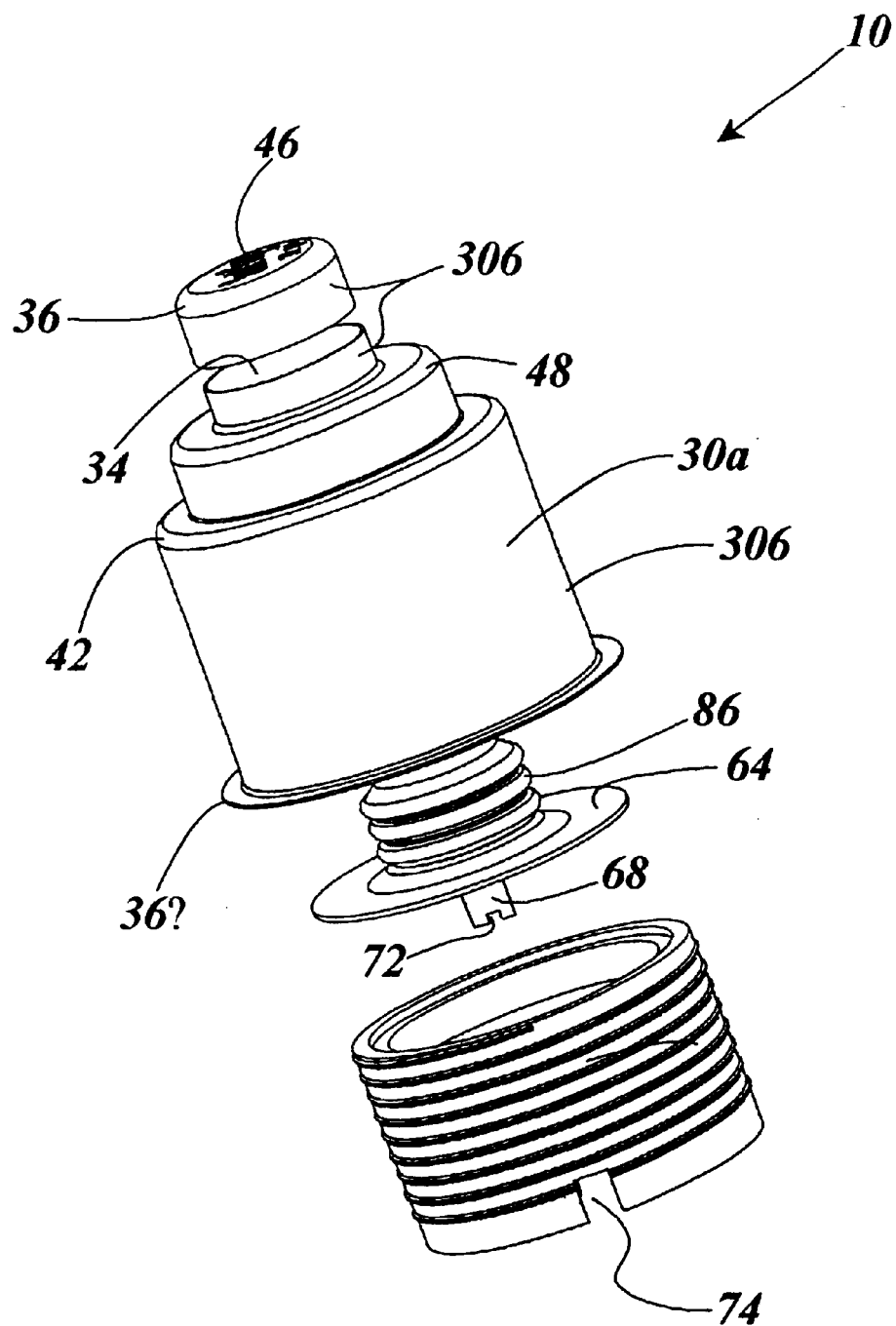
FIG. 6 is an exploded view of the apparatus of FIG. 5.
Figure 7:
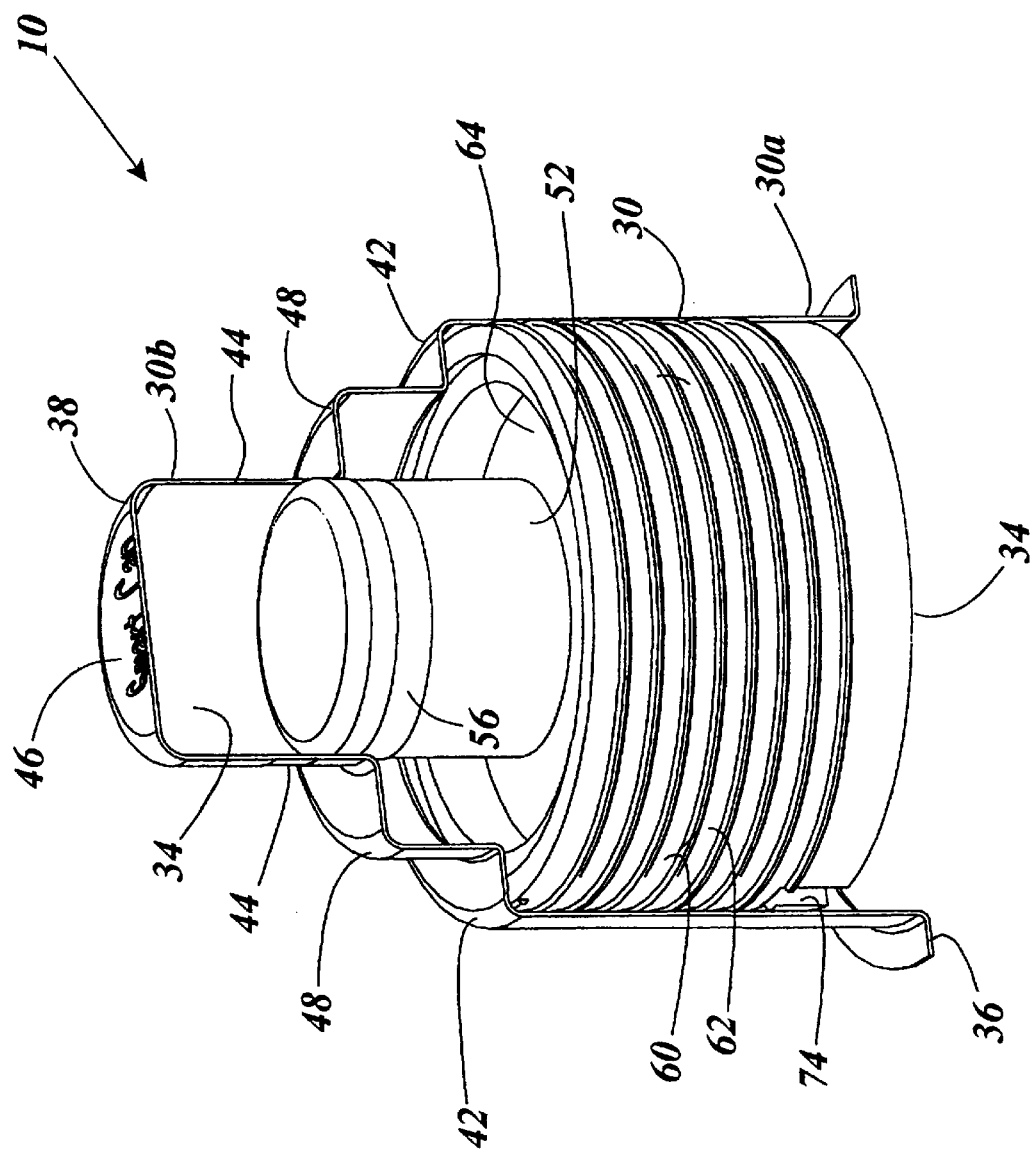
FIG. 7 is a cut-away perspective view of the third embodiment of the gauge apparatus, having the indicator cylinder slidably protruding into the narrower housing tube segment.
Figure 8:
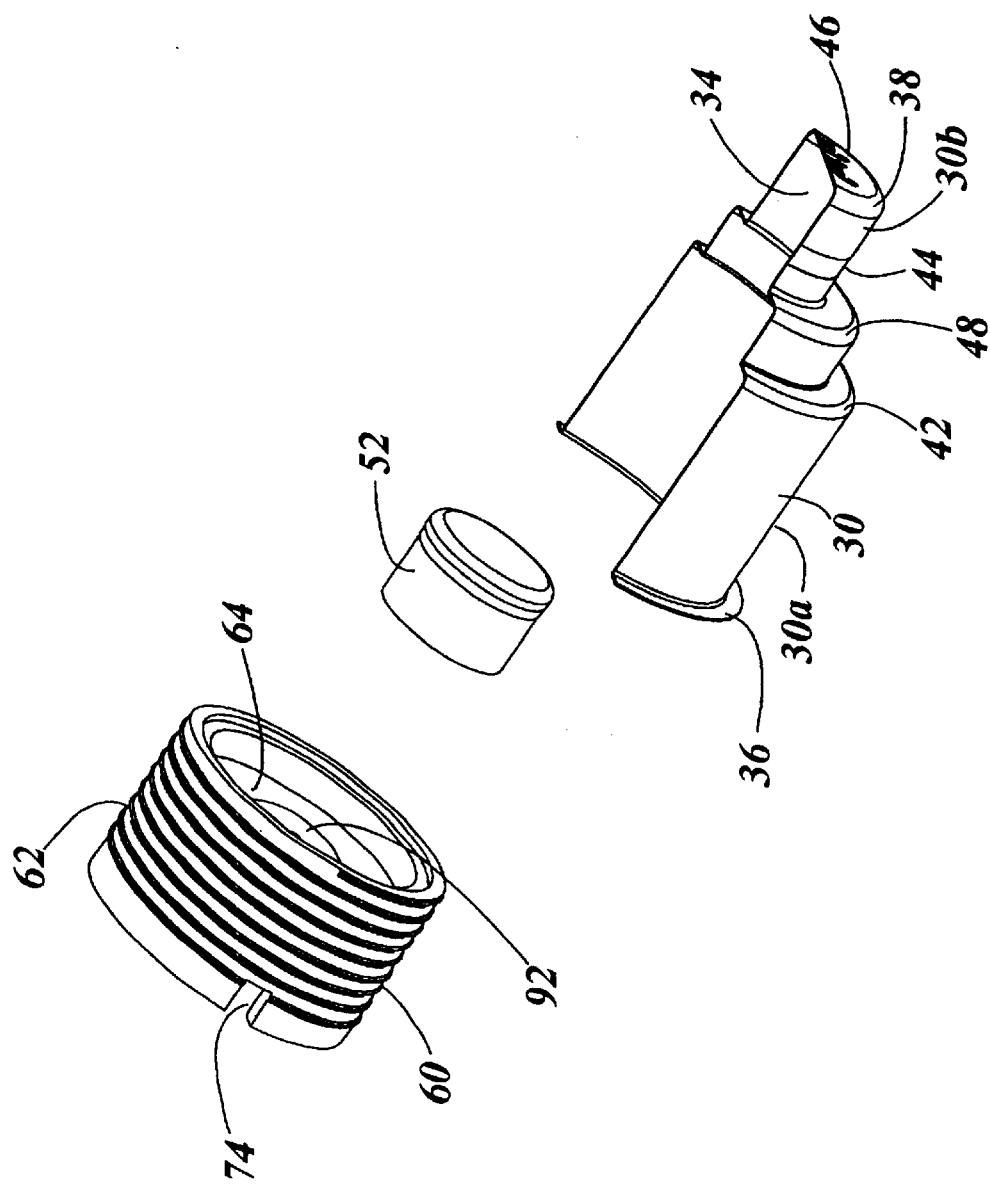
FIG. 8 is an exploded perspective view of the third embodiment of the apparatus shown in FIG. 5.
Figure 9:
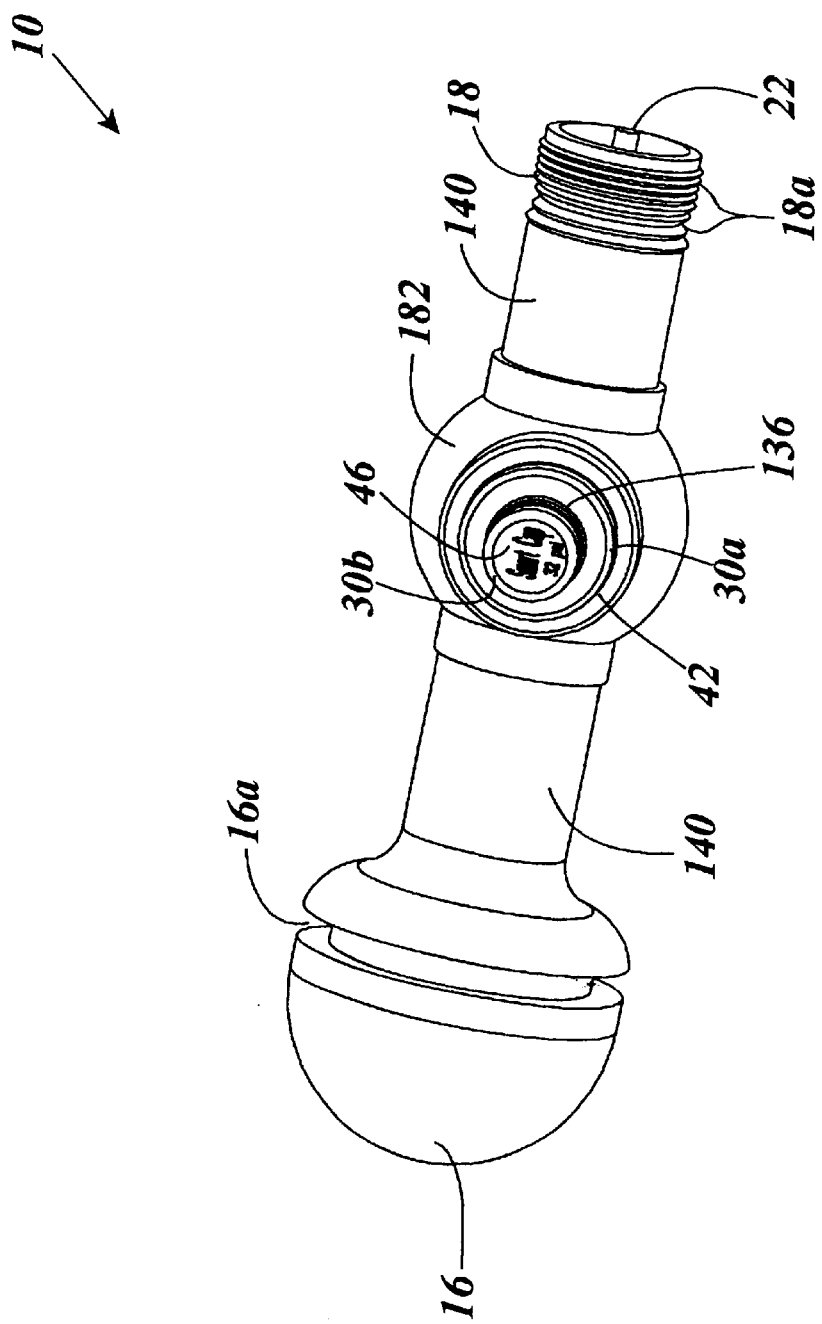
FIGS. 9 and 10 are a perspective side view of the combined valve stem and gauge apparatus of the fourth embodiment.
Figure 10:
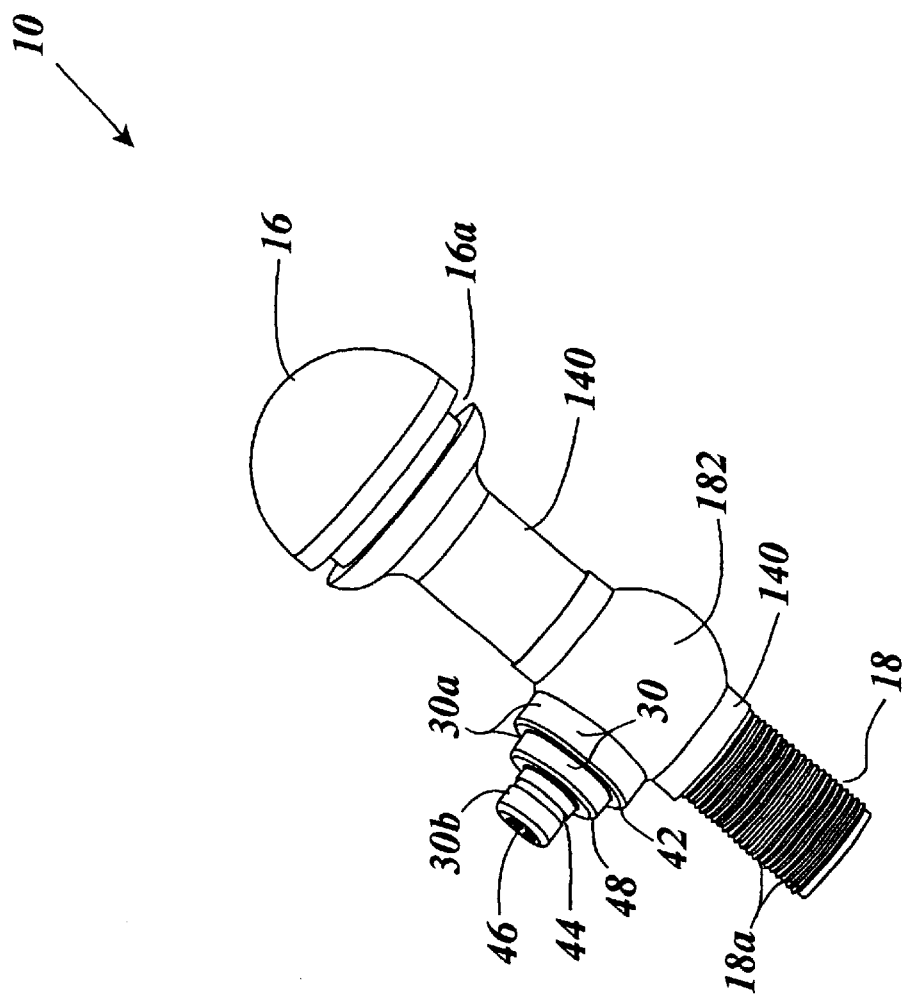
Figure 11:
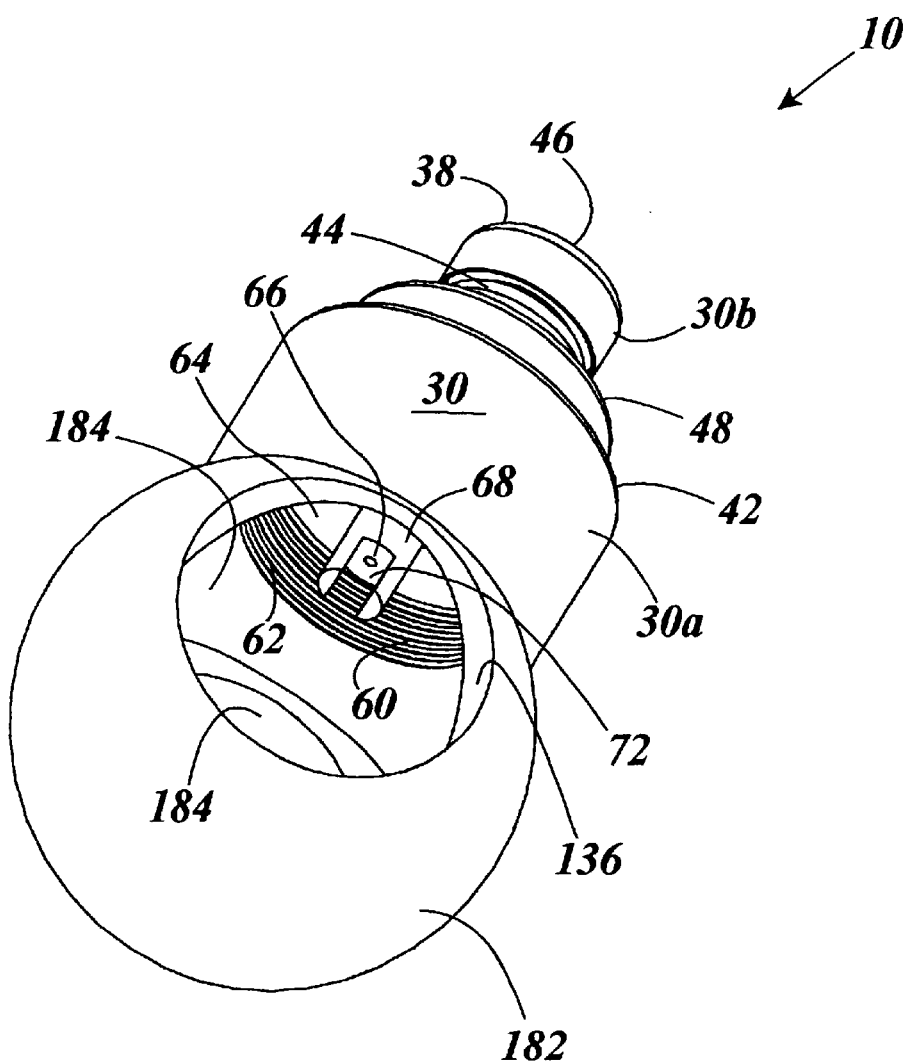
FIG. 11 is a perspective view of the gauge portion of the fourth embodiment of the gauge apparatus which sealingly and engagingly fits around the valve stem body, this view revealing the fitting structure and depression projection within the gauge housing.
Figure 12:
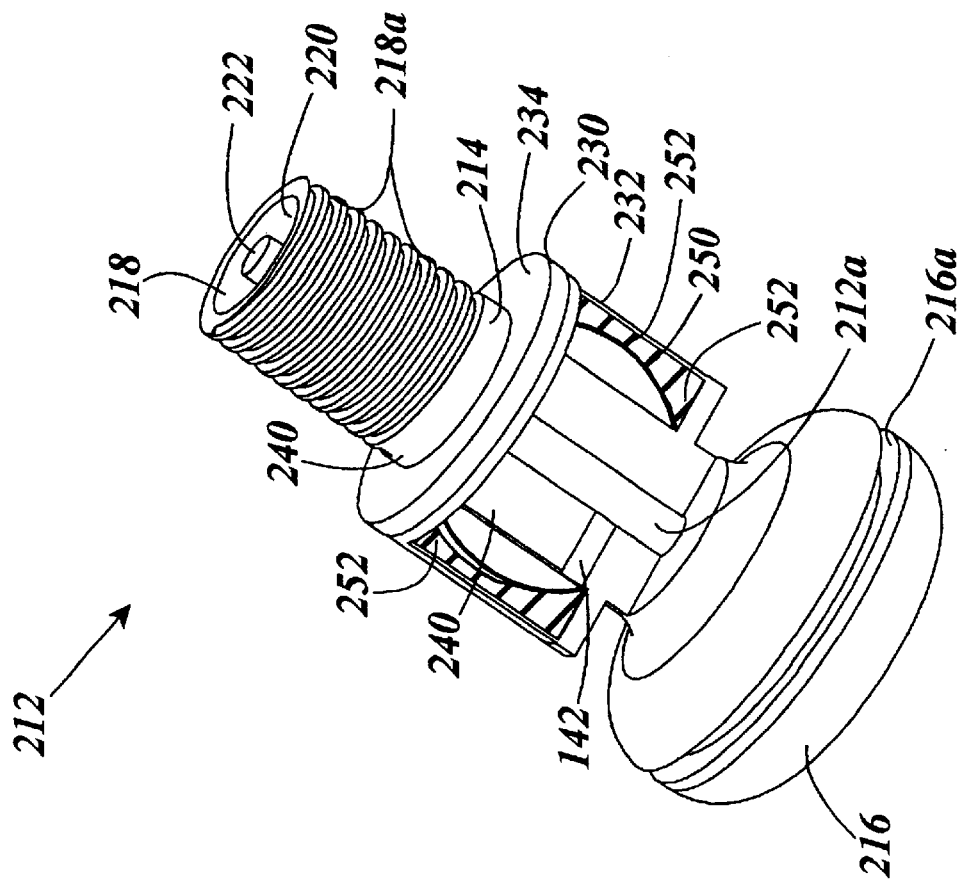
FIG. 12 is a cross-sectional side perspective view of the gauge apparatus of the fifth embodiment, showing the expandable bladder and the stem branch passageway delivering tire air into the gauge housing.
Figure 12A:
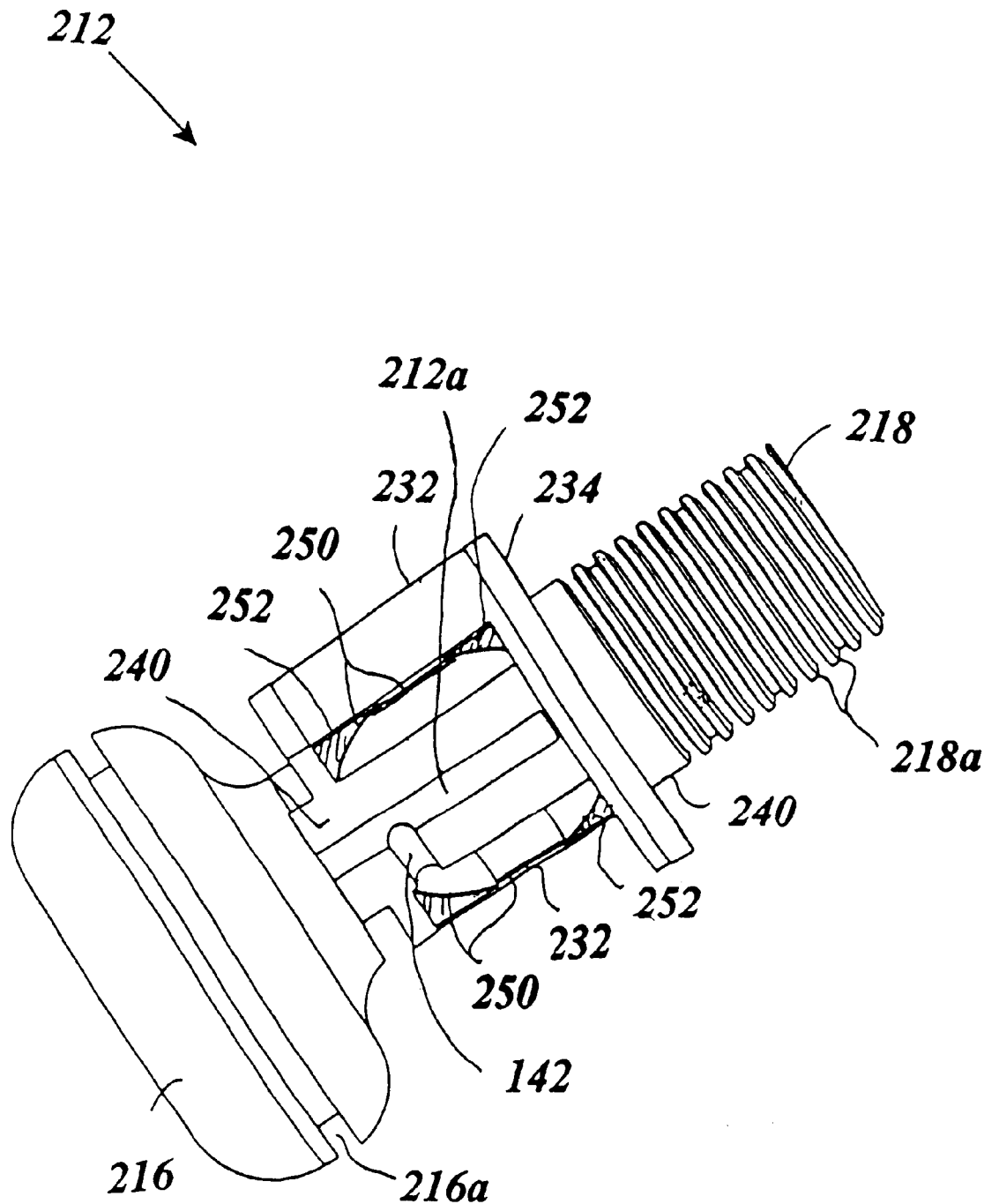
FIG. 12a is another cross-sectional side perspective view of the apparatus of FIG. 12.

Referring to FIGS. 1–12a, an air pressure gauge apparatus 10 is disclosed which is combined with a tire valve stem 12 to remain on the tire (not shown) and continuously display the tire pressure, so that at any moment the user may stop the vehicle and see at a glance whether the tire is under-, over- or correctly inflated. The gauge apparatus remains joined to the vehicle tire while the tire is stationary as well as while the tire is rolling. Gauge apparatus 10 preferably is combined with the valve stem 12 either by screwing it onto existing external cap threads 18a of the valve stem 12 and letting it remain attached until momentary removal during tire inflation, or by integrating it permanently into the structure of the valve stem 12 itself during stem manufacture.

The essential elements of apparatus 10 include an apparatus housing 30, containing a received air chamber 32 for placement in fluid communication with received air from within a vehicle tire and containing a biasing air chamber 34 containing a fixed quantity of biasing air, the chambers 32 and 34 being sealingly separated from each other by a pressure equilibration structure 50 which includes a pressure indicator element 52. The pressure equilibration structure 50 moves within the housing 30 to alter the relative volumes of the two chambers 32 and 34 and thus to equalize the pressures of these two chambers. The pressure indicator element 52 moves relative to the apparatus housing 30 as the equilibration structure 50 moves to equalize chamber 32 and 34 pressures to display a tire pressure reading.

Gauge apparatus 10 operates on the principle of continuous re-establishment of pressure equilibrium, where alteration of received air pressure from outside apparatus 10, that is, from within the tire, causes movement of the indicator element 52 within the housing 30 against the trapped, fixed quantity of biasing air sealed within the biasing air chamber 34. The biasing air functions as a fixed and constant standard against which varying tire pressure is measured. The pressure of the biasing air exerts a force against a biasing air chamber side of equilibration structure 50, while the received air exerts a counterbalancing force against the opposing, received air chamber side of equilibration structure 50. A change in received pressure alters the force against one side of equilibration structure 50, so that pressure from the biasing air on the other side of the equilibration structure 50 must increase or decrease to offset and thus re-establish equilibrium about the equilibration structure 50.

To increase the biasing air pressure, the equilibration structure 50 must move a certain distance to compress the biasing air to a certain extent, and this movement of equilibration structure 50 correspondingly alters the tire pressure magnitude displayed by the indicator element 52. To decrease the biasing air pressure, the equilibration structure 50 must move a certain distance to decompress the biasing air to a certain extent, and by the same token this movement of equilibration structure 50 correspondingly alters the tire pressure magnitude displayed by indicator element 52.

First Preferred Embodiment

A first embodiment of the inventive gauge apparatus 10 is removably secured to the existing tire valve stem 12. See FIG. 1. A standard tire valve stem 12 includes a tubular stem body 14 containing an axial passageway 12a and a standard valve assembly 20 having an outwardly biased valve opening shaft 22. The stem body 14 has a tire connection end 16 with a circumferential groove 16a which snaps firmly and sealingly into the edge of a tire valve stem port (not shown), and has an air receiving end 18. The air receiving end 18 typically is made of metal and has external threads 18a for affixation of a valve stem cap 24 and internal threads into which the valve assembly 20 is screwed.

The gauge apparatus 10 includes a tubular housing 30 having an open housing connection end 36 and a closed indicator display end 38. See FIGS. 2–3. The housing 30 abruptly reduces in diameter between the two ends 36 and 38 to define a primary housing step 42, so that the housing connection end 36 is a wider housing tube segment 30a and the housing indicator display end 38 is a narrower housing tube segment 30b. The housing indicator display end 38 includes a transparent indicator display window 44 and terminates in an integral housing end wall 46. An intermediate, secondary housing step 48 is optionally provided between the wider and narrower housing tube segments 30a and 30b.

For one version, the equilibration structure 50 includes diaphragm disk 54 with an indicator element in the form of an indicator cylinder 52 secured to its biasing air chamber face. The diaphragm disk 54 is sized in diameter to fit closely within the wider housing tube segment 30a inner diameter and sealingly fits against the shoulder defined by primary housing step 42, so that indicator cylinder 52 extends into the biasing air chamber 34 and passes beside the indicator display window 44. Either or both of the indicator cylinder 52 and the window 44 are marked with calibrations 56 so that any given position of the indicator cylinder 52 relative to the window 44 aligns a calibration and thus defines a pressure reading. The reading may be a color indicating underpressurization, overpressurization or proper pressurization of the tire, so that the calibrations 56 are three differently colored circumferential bands extending around the indicator cylinder 52. Alternatively, calibrations 56 may be numbered line segments or dots on display window 44 indicating actual pressure readings, such as in pounds per square inch. See FIG. 2.

A fitting structure 60 is provided including an internally threaded fitting tube 62 having a fitting structure partition wall 64 with an air delivery passageway 66 passing therethrough and axially through a valve opening shaft depression projection 68 and an external diameter substantially matching the wider housing tube segment 30a inner diameter is fitted into the wider housing tube segment 30a until it abuts the diaphragm disk 54 to seal the disk 54 against the primary step 42 shoulder. See FIG. 4. Shaft depression projection 68 has a diametric groove 72 across its free end to permit released tire air to flow between the abutting valve opening shaft 22 and shaft depression projection 68 into passageway 66. Notches 74 are provided in the fitting structure 60 rim for engagement by a tool (not shown) for insertion of the fitting structure 60 into the wider housing tube segment 30a during manufacture. Then fitting structure 60 exterior surface is sealingly secured to the wider housing tube segment 30a inner surface, such as by melding or with an appropriate glue.

Apparatus 10 is screwed onto the air receiving end 18 of the valve stem body 14 so that a seal is created between the apparatus 10 and the valve stem body 14, and so that the shaft depression projection depresses 68 the valve opening shaft 22 against the biasing of the valve assembly 20 internal spring (not shown) to an extent which opens the valve assembly 20 to pass air from within the tire into the housing received air chamber 32, through the air delivery passageway 66, and against the diaphragm disk 54. The pressure of the air from the tire, i.e. the received air, deflects the diaphragm disk 54 toward the biasing air chamber 34, compressing the biasing air until the biasing air pressure rises to equal the tire air pressure. At this moment of equilibrium, the diaphragm 54 and the attached indicator cylinder 52 come to rest. The calibrations 56 registering in the display window 44 when indicator cylinder 52 comes to rest indicate the pressure of the air within the tire, either in terms of under- or over- or correct inflation, or in terms of an actual pressure measurement expressed in force per square unit of area.

Second Preferred Embodiment

In a second embodiment, the diaphragm disk 54 is eliminated, and an indicator element in the form of an expandable indicator bellows 86 is attached to the partition wall 64 and protruding into biasing air chamber 34. See FIGS. 5 and 6. Air delivery passageway 66 in partition wall 64 is widened to pass received air from the tire into indicator bellows 86. The expansion or contraction of indicator bellows 86 into the biasing air chamber 34 brings the tire air and biasing air pressures into equilibrium. The position of the indicator bellows 86 relative to the display window 44 determines which calibration 56 registers in the display window 44 and thereby indicates the tire air pressure.

Third Preferred Embodiment

In a third embodiment, cylinder 52 is rigid and slidably mounted within narrower housing tube segment 30b. See FIGS. 7–8. Once again, diaphragm disk 54 is eliminated for this embodiment. The cylinder 52 sealingly and slidably moves within narrower housing tube segment 30b, so that biasing air is compressed between the cylinder 52 and the walls of biasing air chamber 34. As in the previous variations, the cylinder 52 is marked with calibrations 56 of either type previously described, which register with the display window 44 to indicate the tire pressure.

Fourth Preferred Embodiment

A fourth embodiment is provided which incorporates the elements of the first embodiment, but the gauge apparatus 10 is manufactured as an integral part of the valve stem 120. See FIGS. 9–11. The housing connection end 136 is sealingly secured to a side of the valve stem body 140 and protrudes radially outward from valve stem body 140. The housing connection end 136 may be formed integrally with a circumferential housing extension 182 having a port 184 into which the stem body 140 is sealingly fitted. A stem branch passageway 142 extends radially from the interior of stem 120 and opens into the housing connection end 136. It is further contemplated, that the elements of the second and third embodiments may also be incorporated into a valve stem 120 during manufacture, also by securing housing connection end 136 sealingly to the side of valve stem body 140 and providing a stem branch passageway 142 opening into the housing connection end 136.

Fifth Preferred Embodiment

A fifth embodiment is provided, once again in which the gauge apparatus 10 is manufactured as an integral part of the valve stem 212. See FIGS. 12–12a. The housing 230 for this embodiment is an annular structure having a housing circumferential wall 232 through which the tubular stem body 240 is axially and sealingly fitted and secured. Circumferential wall 232 is formed of either transparent or translucent material. Within the housing 230, wrapping circumferentially around and sealingly secured to the tubular valve stem body 240 outer surface is an outwardly arched and elastic bladder 250, which preferably is brightly colored. A stem branch passageway 242 extends radially from the interior of the stem 212 and opens within the bladder 250. A dark, opaque liquid 252 is provided in the annular space between the bladder 250 and the housing circumferential wall 232, with a certain quantity of trapped, biasing air also continued within this annular space. The volume and pressure of the biasing air as well as the elastic resistance of the bladder 250 are selected during manufacture in relation to a given minimum adequate tire air pressure, so that when the tire air pressure is adequate the annular central region of bladder 250 bears against the housing circumferential wall 232 and thus becomes visible through the displaced dark, opaque liquid 252. In the event of tire deflation to a pressure below the given, minimum value for safe and proper tire wear, the bladder 250 elastically contracts to recede radially inward and thus move out of contact housing circumferential wall 232, so that the opaque liquid 252 passes between the wall 232 and the bladder 250 and obscures the bladder 250 from view. The clearly notable absence of the bright bladder 250 band bearing against the housing circumferential wall 232 alerts the vehicle operator of hazardously low tire air pressure, without the operator having to access or use any tool. As the operator adds air to the tire, he or she can watch the housing circumferential wall and know that adequate tire pressure is reached when the bright band of the bladder 250 midsection abuts the wall 232 and thereby becomes visible.

The remainder of the tire stem 212 is conventional. As mentioned above, it includes a tubular stem body 214 containing a standard valve assembly 220 having an outwardly biased valve opening shaft 222. The stem body 214 has a tire connection end 216 preferably including a circumferential groove 216a which snaps firmly and sealingly into the edge of a tire valve stem port, and has an air receiving end 218. The air receiving end 218 preferably is made of metal and has external cap threads 218a for affixation of a valve stem cap 224 and internal threads into which the valve assembly 220 is screwed.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A tire pressure gauge apparatus for securing to a vehicle tire valve stem mounted to a tire valve stem port in a vehicle tire, the valve stem including a tubular stem body containing a valve assembly having a valve opening means, the stem body having a stem connection end fitting sealingly to the tire valve stem port, and having a stem air receiving end, the apparatus comprising:

a housing for placement in fluid communication with received air from within the tire contained within the tire valve stem;

means for opening said valve opening means;

and a pressure equilibration structure dividing said housing into a received air chamber and a biasing air chamber and comprising a pressure indicator element, said pressure equilibration structure and said pressure indicator element being progressively movable relative to said housing and thereby substantially continuously maintaining and re-establishing pressure equilibrium between air within said received air chamber and air within said biasing air chamber, and said pressure indicator element displaying a pressure reading of received air from within the tire which varies with the position of said pressure equilibration structure relative to said housing;

such that alteration of the pressure of received air within said received air chamber from the valve stem causes movement of said equilibration structure within said housing to re-establish pressure equilibrium between biasing air sealed within said biasing air chamber and received air within said received air chamber, and movement of said equilibration structure causes said indicator element to move relative to said housing to provide a received air pressure reading.

2. A tire pressure gauge apparatus for securing to a vehicle tire valve stem mounted to a valve stem port in a vehicle tire, the valve stem including a tubular stem body containing a valve assembly having an outwardly biased valve opening shaft, the stem body having a stem connection end with a circumferential groove for fitting sealingly into an edge of the tire valve stem port, and having a stem air receiving end having external threads for affixation of a valve stem cap and having internal threads into which the valve assembly is screwed, the apparatus comprising:

a housing for placement in fluid communication with received air from within the tire contained within the tire valve stem;

means for depressing said valve opening shaft and thereby opening said valve assembly, said means for depressing being connected to said housing;

and a pressure equilibration structure dividing said housing into a received air chamber and a biasing air chamber and comprising a pressure indicator element, said pressure equilibration structure and said pressure indicator element being progressively movable relative to said housing, and thereby substantially continuously maintaining and re-establishing pressure equilibrium between air within said received air chamber and air within said biasing air chamber and said pressure indicator element displaying a pressure reading of received air from within the tire which varies with the position of said pressure equilibration structure relative to said housing;

such that alteration of the pressure of received air within the received air chamber from the valve stem causes movement of said equilibration structure within the housing to re-establish pressure equilibrium between biasing air sealed within said biasing air chamber and received air within said received air chamber, and movement of said equilibration structure causes said indicator element to move relative to said housing to provide a received air pressure reading.

3. The gauge apparatus of claim 2, wherein said housing is a tubular housing having an open connection end and a closed indicator display end, said biasing air chamber including an indicator display window and terminating in an integral housing end wall;

and wherein said pressure equilibration structure comprises a diaphragm panel and said indicator element comprises an indicator cylinder marked with calibrations and secured to said diaphragm panel and extending into said biasing air chamber and passing adjacent to said indicator display window, said diaphragm panel being sized in diameter to fit within said housing and being sealingly and circumferentially joined to the inner surface of said housing;

means for sealingly securing said diaphragm panel to said step;

valve opening shaft depression means for depressing the valve opening shaft to release air from within the tire into said received air chamber;

means for securing the valve stem body to and in fluid communication with said received air chamber;

such that the apparatus is screwed onto the stem air receiving end to create a seal between said received air chamber and the valve stem body, and such that the valve opening shaft depression means depresses the valve opening shaft to an extent which opens the valve assembly to pass air from within the tire into said received air chamber and against said diaphragm panel; and such that pressure of received air from within the tire deflects said diaphragm panel toward said biasing air chamber, thereby compressing the biasing air until the pressure of the biasing air rises to equal the pressure of the received air within the received air chamber, whereupon the attached indicator cylinder comes to rest to indicate the pressure of air contained within said received air chamber and within the tire.

4. The gauge apparatus of claim 3, wherein said calibrations are circumferential color bands.

5. The gauge apparatus of claim 3, wherein said calibrations are lines labeled with pressure reading figures.

6. The gauge apparatus of claim 2, wherein said housing is a tubular housing having an open connection end and a closed indicator display end, said biasing air chamber including an indicator display window and an integral housing end wall;

and wherein said indicator element comprises an indicator cylinder dividing said biasing air chamber from said received air chamber and being slidably mounted within said housing to slide into and out of said biasing air chamber, said indicator cylinder being marked with calibrations and passing adjacent to said indicator display window;

valve opening shaft depression means for depressing the valve opening shaft to release air from within the tire into said received air chamber;

means for securing the valve stem body to and in fluid communication with said received air chamber;

such that the apparatus is screwed onto the stem air receiving end to create a seal between said received air chamber and the valve stem body, and such that the valve opening shaft depression means depresses the valve opening shaft to an extent which opens the valve assembly to pass air from within the tire into said received air chamber and against said indicator cylinder; and such that pressure of received air from within the tire slides said indicator cylinder into said biasing air chamber, thereby compressing the biasing air until the pressure of the biasing air within the biasing air chamber rises to equal the pressure of the received air within the received air chamber, whereupon the indicator cylinder comes to rest to indicate the pressure of air contained within said received air chamber and within the tire.

7. The gauge apparatus of claim 2, wherein said housing is a tubular housing having an open connection end and a closed indicator display end, said biasing air chamber including an indicator display window and terminating in an integral housing end wall;

and wherein said pressure equilibration structure comprises a partition wall having a partition wall air passing port and an indicator bellows secured to said partition wall over said partition wall air passing port and extending into said biasing air chamber, said indicator bellows being axially expandable into said biasing air chamber, said indicator bellows being marked with calibrations and passing adjacent to said indicator display window;

valve opening shaft depression means for depressing the valve opening shaft to release air from within the tire into said received air chamber and into said indicator bellows;

means for securing the valve stem body to and in fluid communication with said received air chamber;

such that the apparatus is screwed onto the stem air receiving end to create a seal between said received air chamber and the valve stem body, and such that the valve opening shaft depression means depresses the valve opening shaft to an extent which opens the valve assembly to pass air from within the tire into said received air chamber and into said indicator bellows; and such that pressure of received air from within the tire expands said indicator bellows into said biasing air chamber, thereby compressing the biasing air until the pressure of the biasing air within said biasing air chamber rises to equal the pressure of the received air within said received air chamber, whereupon the attached indicator bellows ceases to expand, and indicates the pressure of air contained within said received air chamber and tire.

8. A tire pressure gauge and valve stem apparatus for securing into a valve stem port in a vehicle tire, comprising:

a vehicle tire valve stem comprising a tubular stem body containing a valve assembly, said stem body having a stem connection end with means for fitting sealingly into a tire valve stem port, and having a stem air receiving end;

a gauge housing secured to said valve stem body in fluid communication with received air contained within said valve stem body through a valve stem body lateral opening;

and a pressure equilibration structure dividing said housing into a received air chamber and a biasing air chamber and comprising a pressure indicator element, said pressure equilibration structure and pressure indicator element being progressively movable relative to said housing and thereby substantially continuously maintaining and re-establishing pressure equilibrium between air within said received air chamber and air within said biasing air chamber and displaying a pressure reading of received air from within the tire which varies with the position of the pressure equilibration structure relative to the housing;

such that alteration of the pressure of received air within the received air chamber causes movement of said pressure equilibration structure within the housing to re-establish pressure equilibrium between biasing air sealed within said biasing air chamber and received air within said received air chamber, and movement of said equilibration structure causes said indicator element to move relative to said housing to provide a received air pressure reading.

9. The apparatus of claim 8, wherein said housing is a tubular housing having a connection end secured to a side of said valve stem body and a closed indicator display end, said biasing air chamber including an indicator display window and terminating in an integral housing end wall;

and wherein said pressure equilibration structure comprises a diaphragm panel and said indicator element comprises an indicator cylinder marked with calibrations and secured to said diaphragm panel and extending into said biasing air chamber and passing adjacent to said indicator display window, said diaphragm panel being sized in diameter to fit within said housing and being sealingly and circumferentially joined to the inner surface of said housing;

and means for sealingly securing said diaphragm panel to said step;

such that pressure of received air from within the tire deflects said diaphragm panel toward said biasing air chamber, thereby compressing the biasing air until the pressure of the biasing air within the biasing air chamber rises to equal the pressure of the received air within the received air chamber, whereupon the attached indicator cylinder comes to rest to indicate the pressure of air contained within said received air chamber and within the tire.

10. The gauge apparatus of claim 9, wherein said calibrations are circumferential color bands.

11. The gauge apparatus of claim 9, wherein said calibrations are lines labeled with pressure reading figures.

12. The gauge apparatus of claim 8, wherein said housing is a tubular housing having a connection end secured to a side of said valve stem body and a closed indicator display end, said biasing air chamber including an indicator display window and terminating in an integral housing end wall;

and wherein said indicator element comprises an indicator cylinder dividing said biasing air chamber from said received air chamber and being slidably mounted within said housing to slide into and out of said biasing air chamber, said indicator cylinder being marked with calibrations and passing adjacent to said indicator display window;

such that pressure of received air from within the tire slides said indicator cylinder into said biasing air chamber, thereby compressing the biasing air until the pressure of the biasing air within the biasing air chamber rises to equal the pressure of the received air within the received air chamber, whereupon the indicator cylinder comes to rest to indicate the pressure of air contained within said received air chamber and within the tire.

13. The gauge apparatus of claim 12, wherein said calibrations are circumferential color bands.

14. The gauge apparatus of claim 12, wherein said calibrations are lines labeled with pressure reading figures.

15. The gauge apparatus of claim 8, wherein said housing is a tubular housing having a connection end and a closed indicator display end, said biasing air chamber including an indicator display window and terminating in an integral housing end wall;

and wherein said pressure equilibration structure comprises a partition wall having a partition wall air passing port and an indicator bellows secured to said partition wall over said partition wall air passing port and extending into said biasing air chamber, said indicator bellows being axially expandable into said biasing air chamber, said indicator bellows being marked with calibrations and passing adjacent to said indicator display window;

such that pressure of received air from within the tire expands said indicator bellows into said biasing air chamber, thereby compressing the biasing air until the pressure of the biasing air within said biasing air chamber rises to equal the pressure of the received air within said received air chamber, whereupon the attached indicator bellows ceases to expand and achieves a substantially fixed position relative to said housing to indicate the pressure of air contained within said received air chamber and within the tire.

16. A tire pressure gauge and valve stem apparatus for securing into a valve stem port in a vehicle tire, comprising:

a vehicle tire valve stem comprising a tubular stem body containing a valve assembly, said stem body having an outer surface and having a stem connection end with means for fitting sealingly into a tire valve stem port, and having a stem air receiving end;

a gauge housing comprising a housing circumferential wall formed of a translucent material and bowed outwardly from said circumferential wall along the longitudinal axis of said housing circumferential wall and wrapped sealingly and circumferentially around said valve stem body; and wherein said equilibration structure is an elastic bladder contained within said housing circumferential wall and wrapped circumferentially around and sealingly secured to the outer surface of said tubular stem body;

a stem branch passageway extending laterally from the interior of said stem body and opening within said bladder;

and a substantially opaque liquid contained within an annular space defined between said bladder and said housing circumferential wall together with a certain quantity of biasing air;

the quantity and pressure of the biasing air and the elastic resistance of said bladder in relation to the minimum adequate tire air pressure being such that a tire air pressure of at least a certain magnitude which is deemed adequate causes said bladder to expand radially, to compress the biasing air and to displace said substantially opaque liquid and bear against the inner surface of said housing circumferential wall, making a portion of said bladder visible through said housing circumferential wall, and such that a tire air pressure of less than the certain magnitude deemed adequate permits the elasticity of said bladder and the pressure of said biasing air to retract said bladder from contact with said housing circumferential wall and said substantially opaque liquid to flow between said bladder and said circumferential wall to obscure said bladder from view.

17. The apparatus of claim 16, wherein said bladder is brightly pigmented and wherein said opaque liquid is darkly pigmented for increased visual contrast between said bladder and said opaque liquid for greater bladder visibility when said bladder bears against said housing circumferential wall.

18. The apparatus of claim 3, wherein said tubular housing comprises an abrupt reduction in diameter between said connection end and said indicator display end defining a housing step forming a housing shoulder, such that said housing connection end is a wider housing tube segment defining said received air chamber and said housing indicator display end is a narrower housing tube segment defining said biasing air chamber; and wherein said diaphragm panel is secured sealingly against said housing shoulder.

19. The apparatus of claim 6, wherein said tubular housing comprises an abrupt reduction in diameter between said connection end and said indicator display end defining a housing step, such that said housing connection end is a wider housing tube segment defining said received air chamber and said housing indicator display end is a narrower housing tube segment defining said biasing air chamber.

20. The apparatus of claim 9, wherein said tubular housing comprises an abrupt reduction in diameter between said connection end and said indicator display end defining a housing step forming a housing shoulder, such that said housing connection end is a wider housing tube segment defining said received air chamber and said housing indicator display end is a narrower housing tube segment defining said biasing air chamber; and wherein said diaphragm panel is secured sealingly against said housing shoulder.

\* \* \* \* \*